Aug. 27, 1940.    B. W. KING    2,212,742
SCALE LEVER SYSTEM
Filed Dec. 9, 1938    4 Sheets-Sheet 1
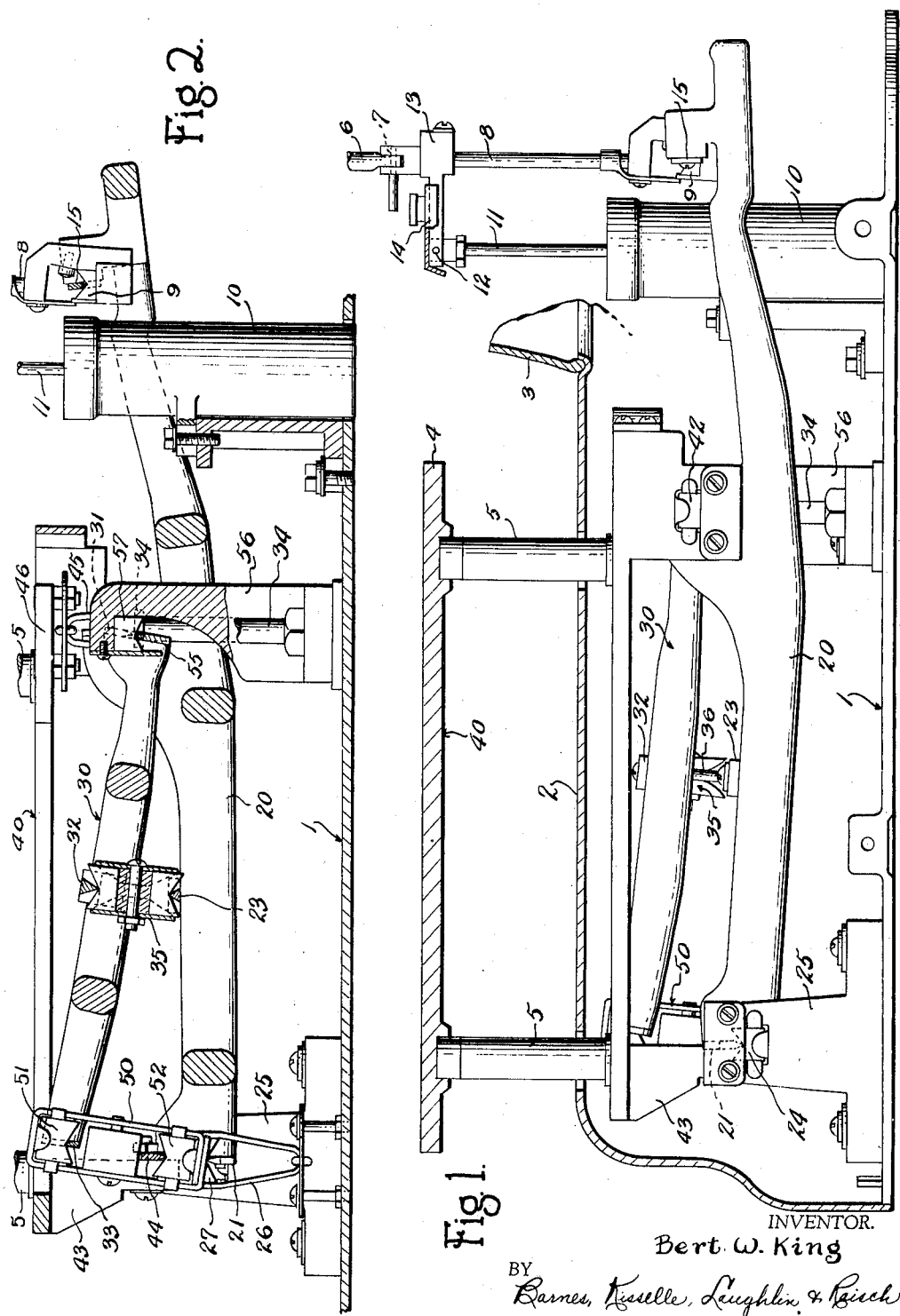
INVENTOR.
Bert W. King
BY Barnes, Kisselle, Laughlin & Raisch
ATTORNEYS INVENTOR.
Bert W. King
BY
Barnes, Kisselle, Laughlin & Raisch
ATTORNEYS Aug. 27, 1940.    B. W. KING    2,212,742
SCALE LEVER SYSTEM
Filed Dec. 9, 1938    4 Sheets-Sheet 4
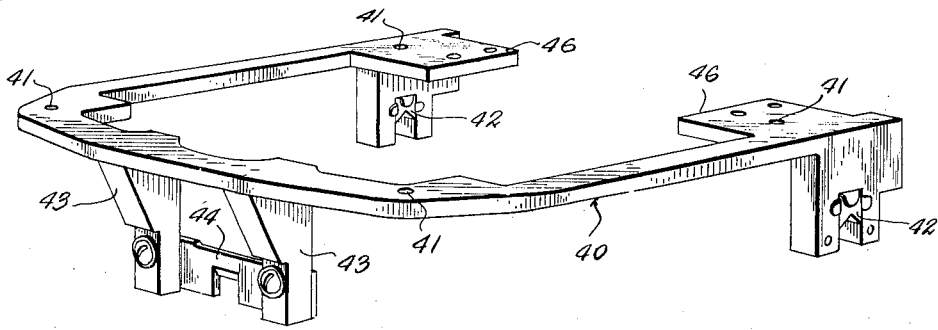
Fig.6.
Fig.7.
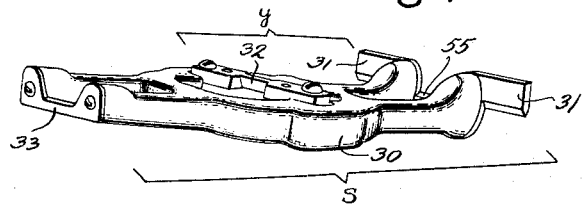
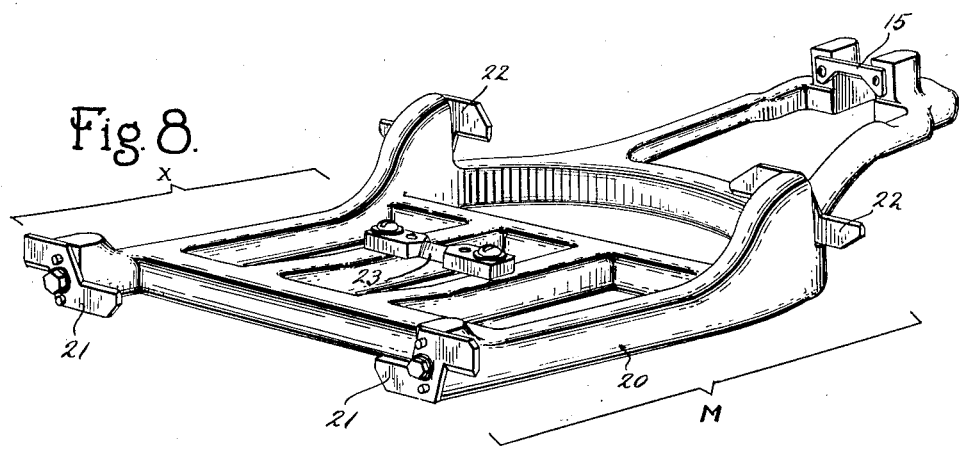
Fig.8.
INVENTOR.
Bert W. King
BY
Barnes, Kisselle, Laughlin & Raisch
ATTORNEYS Patented Aug. 27, 1940

2,212,742

UNITED STATES PATENT OFFICE 2,212,742

SCALE LEVER SYSTEM

Bert W. King, Detroit, Mich.

Application December 9, 1938, Serial No. 244,779

7 Claims. (Cl. 265—71)

This invention relates to a system of levers for scales and it has to do particularly with a lever system for scales used in retail stores or the like where accuracy is demanded. The lever system is, of course, not limited to use with such scales.

Among the objects of the invention is the provision of a novel, simplified lever system, which facilitates initial correct adjustment of the scale and which is so constructed that such initial adjustment will be maintained. A further object is to provide a lever structure which requires very little vertical space, with the result that the platform of a scale may be located relatively low as compared to the surface of the counter or other support upon which the scale rests. There are details of novelty, and these details, together with other objects will become appreciated as the detailed description is considered.

Fig. 1 is a view illustrating the lever system in side elevation and showing some other parts of the scale in section.

Fig. 2 is a view similar to Fig. 1 taken on section line 2—2 of Fig. 3 showing the levers swung upwardly an abnormal amount in order to better show underlying structure.

Fig. 6 is a perspective view of the load receiver.

Fig. 7 is a perspective view of a sublever of the system.

Fig. 8 is a perspective view of the main lever.

Figure 3:
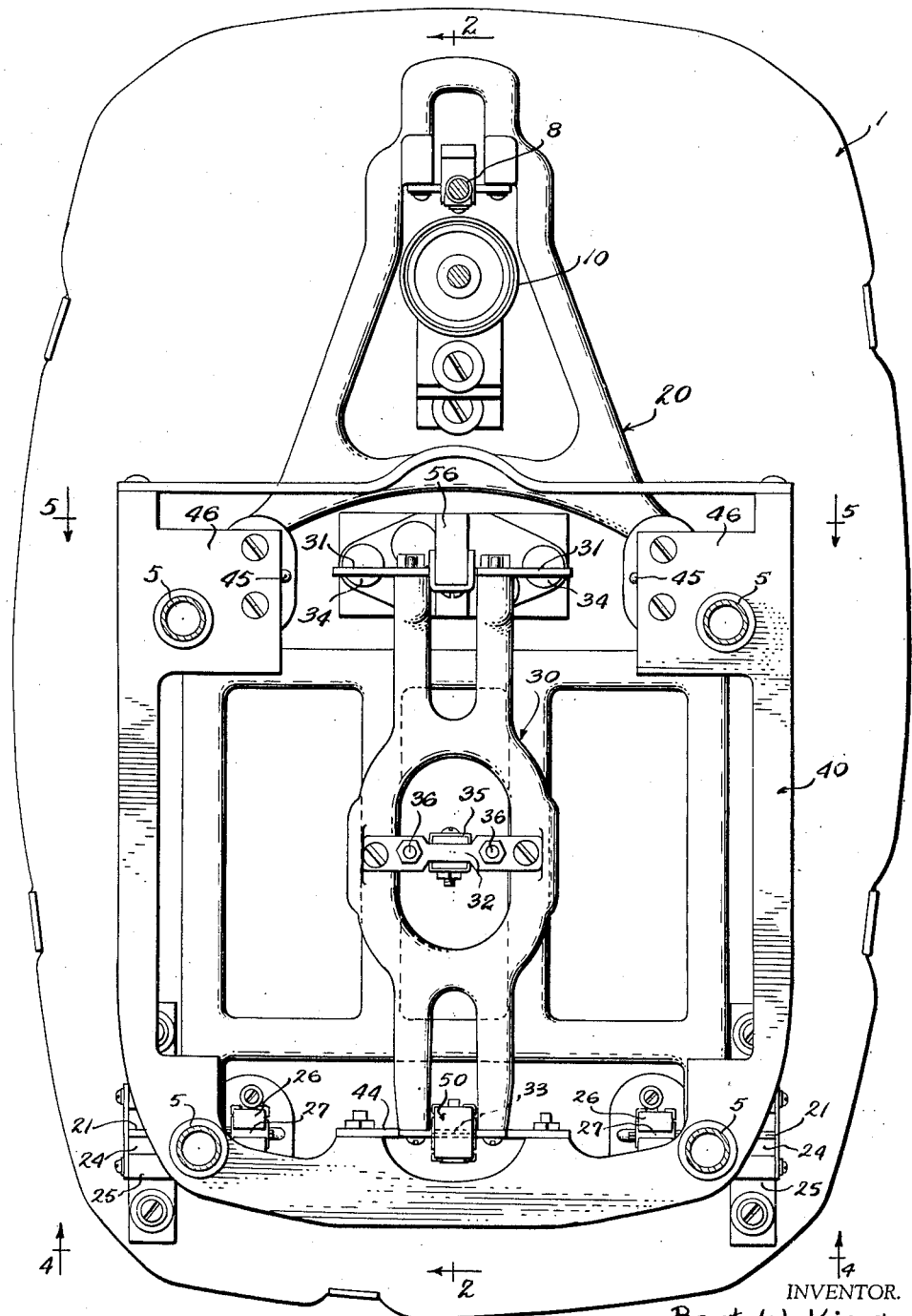
Fig. 3 is a top plan view of the load receiver and lever system.
Figure 4:
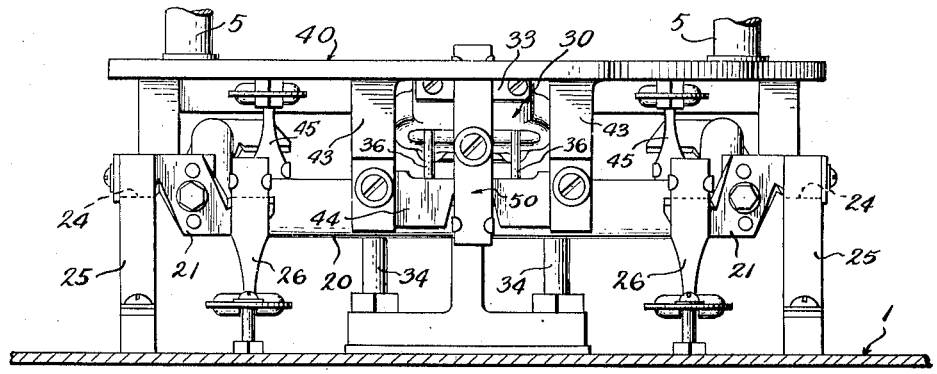
Fig. 4 is an end view of the lever system looking substantially on line 4—4 of Fig. 3.
Figure 5:
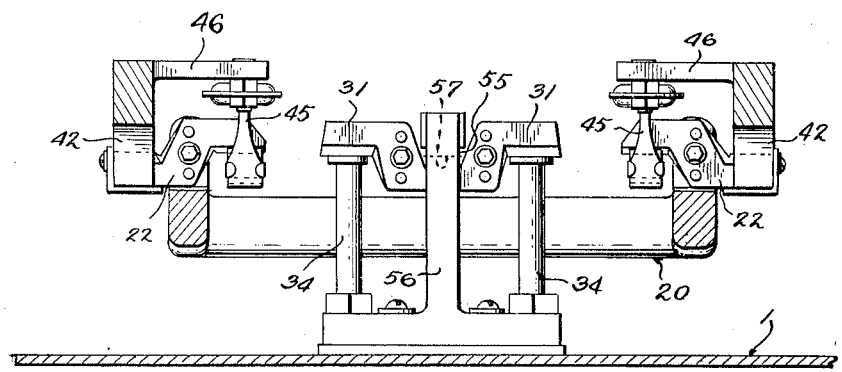
Fig. 5 is a sectional view taken substantially on line 5—5 of Fig. 3.

The base of a scale housing is illustrated at 1, the base having a cover portion 2 overlying the levers, and a portion of a post is illustrated at 3. A load-receiving platform 4 is mounted on posts 5 which extend through apertures in the housing 2 and are supported by the load-receiver. A steelyard is shown at 6 pivotally connected as at 7 to a terminal piece 8 having an inverted agate bearing 9 which supports the main lever. A dash pot takes the form of a cylinder 10 in which is a piston (not shown), while a piston rod 11 is connected as at 12 to an arm 13 secured to the terminal piece 8. A part 14 covers the connection 12.

The main lever is illustrated at 20 and it is of frame structure and has a knife-edge bearing 15 at its projecting small end which seats in the agate bearing 9. It is rather common to refer to bearings of the type shown as agate bearings, since the V-block is made of agate. However, henceforth, such bearings will be referred to as V-bearings.

The main lever is provided with double knife-edge bearings 21 at one end and double knife-edge bearings 22 in an intermediate portion, and an upstanding knife-edge bearing 23 located midway between the bearings 21 and 22. The double knife-edge bearings 21 are pivotally mounted in V-bearing blocks 24 carried by supports 25 and are held down by links 26 with inverted V-bearings 27. Thus it will be seen that the main lever is pivoted at one end with double knife-edge bearings and has a single knife-edge bearing at its opposite end with the steelyard.

A sublever 30 (Fig. 7) has spaced knife-edge bearings 31 at one end, a downwardly directed knife-edge bearing 32 in its intermediate portion, and an upwardly directed knife-edge bearing 33 at its opposite end. The knife-edge bearings 31 rest upon the top of studs 34. A push link 35 with oppositely disposed V-bearings is disposed between the knife-edge bearings 32 and 23 to transfer the load from the sublever to the main lever. As shown in Fig. 3, the piece forming the knife-edge 32 and the piece forming the knife-edge 23 are loosely connected by bolts 36 to keep the levers from separating, although these bolts perform no function in the weighing operation.

A load receiver 40 shown in Fig. 6 has apertures 41 for receiving the posts 5 and it is equipped with spaced inverted V-bearings 42 near one end. The opposite end has downwardly projecting brackets 43 which carry an inverted knife-edge bearing 44. The V-bearings 42 rest upon the outwardly projecting portions of the knife-edge bearings 22. Links 45 depend from projections 46 and have V-bearing blocks engaging under the inwardly extending knife-edge bearing members 22.

A link 50 has a V-bearing block 51 engaging the knife-edge 33 on the sublever and a V-bearing 52 engaging under the knife-edge 44 on the load receiver.

The member with the knife-edges 31 of the sublever has an intermediate knife-edge 55 facing upwardly and a bracket 56 carries an inverted V-bearing 57 which engages over the knife edge 55, thus holding the knife-edges 31 on the studs 34.

It will thus be observed that the main lever has a double knife-edge bearing at its pivoted end with the double knife-edge serving as the main fulcrum, so to speak, and serving to hold this end of the lever down in position; but the main lever has a single bearing with a steelyard at its opposite end. The load carrier has a double knife-edge bearing on an intermediate portion of the main lever and a single connection at its opposite end with the sublever comprising the link 50 and knife-edges 33 and 44 at the opposite end. The push link or strut 35 supports the sublever from the main lever. Thus all the load is transferred to the main lever.

When the sublever is in a horizontal position its knife-edge 33 is in alignment with the knife-edges 21. In this position the knife edges 22 are in alignment with the knife edges 31. Preferably the scale operates over this intermediate position in its normal function; that is to say, when unloaded the angularity of the sublever relative to the horizontal is about the same as it is under full load but on opposite sides of a horizontal line. Fig. 3 shows about the normal unloaded position.

In the actuation of the main lever, the load supporting knife-edges 22 move in an arc around the knife-edge bearings 21. The distance between the knife-edges 31 and 33 on the sublever is the same as the distance between the knife-edges 22 and 21 on the main lever. In the actuation of the lever system, knife-edge 33 moves in an arc around the knife-edge bearings 31. The load carrier, therefore, shifts laterally corresponding to the arcuate movement of the knife-edges 22, but the link 50 which carries the load at the opposite end of the carrier rocks to permit this movement. The bearings 23 and 32 are disposed mid-way, respectively, between the bearings 21 and 22 on the main lever and 31 and 33 on the sublever, and therefore the longitudinal compound of the arcuate movement amounts to only half that of the knife-edge bearings 22 and knife-edge bearing 33, but the arcuate movements are in the opposite direction. These opposite arcs, however, are small, and therefore the strut 35 can be short, thus making for a low lever structure and low platform position.

The sublever shown herein is an even lever in that it has no multiplying action; that is to say, the distances from the center knife-edge 32 to the knife-edges 31 and 33 are equal. The sublever has single center line connections for the load, namely, at the single center bearings 32 and 33. These are in line with each other on the center of the lever and this makes it much easier to properly assemble and adjust the scale, since laterally spaced connections introduce possible errors and introduce the possibility of variation after initial installation. The sublever, in effect, has three bearings, all in a row lengthwise thereof, and all center line bearings. This likewise centralizes the stressed load through a single line in the sublever.

Another point of importance is the fact that the steelyard has a single connection to the main lever; accordingly, the steelyard may shift or wobble, so to speak, in any direction, and this is particularly advantageous in a low scale structure. This has been accomplished by disposing the dash pot off center, or in other words, out of the line of forces. This may introduce some torque on the steelyard as the levers function, but when they come to rest there is no torque.

The lever system shown herein is arranged so that the length of the lever arms of the main lever and the sublever is equal. In other words, the distance on the sublever between bearings 32 and 31 is the same as the distance between 32 and 33; and these distances are the same as the distance between bearings 23 and 22 and bearings 23 and 21 on the main lever. However, the lever system may not be of this so-called even type. To exemplify what is meant, the distance from bearings 21 to 22 on the main lever may be considered as M and the distance from bearings 21 to 23 on the main lever considered as X; the distance between bearings 33 and 31 on the sublever may be considered S, while the distance on the sublever from 32 to 31 considered Y. Now the lengths of the various lever arms may be varied as desired, so long as a definite relation is maintained, and this relation is as follows: X:M::Y:S. In other words, the relation between the portion X of the main lever and the distance between the load supporting bearings of the main lever must be the same as the relation of the portion Y of the sublever is to the length of the sublever between its end bearings.

In some of the claims appended hereto it is stated that some of the bearings are of the fixed type. This language is used to define bearings of such a fixed nature that the load receiver shifts with the arcuate movement of the bearing on the lever as distinguished from a load support of the pivoted link or strut type.

I claim:

1. A scale lever system comprising, a main lever, a double knife-edge bearing at one end of the main lever and forming a fulcrum, a steelyard connection at the opposite end of the main lever, a load receiver, a double knife-edge bearing of the fixed type between one end of the load receiver and an intermediate portion of the main lever, a sublever, a fulcrum bearing at one end of the sublever, a load bearing at the other end of the sublever, a link connection between the load receiver and the load bearing of the sublever, and a push link between the sublever and main lever and operating on bearings on the main lever and sublever located so that the distance between the push link and the fulcrum of the main lever relative to the distance from the fulcrum to the load bearing on the main lever is the same as the distance from the push link to the fulcrum of the sublever is to the distance from the fulcrum to the load bearing of the sublever.

2. A scale lever system comprising, a main lever, a double knife-edge bearing at one end of the main lever and forming a fulcrum, a steelyard connection at the opposite end of the main lever, a load receiver, a double knife-edge bearing of the fixed type between one end of the load receiver and an intermediate portion of the main lever, a sublever, a fulcrum bearing at one end of the sublever, a load bearing at the other end of the sublever, a link connection between the load receiver and the load bearing of the sublever, and a push link between the sublever and main lever and operating on bearings on the main lever and sublever located so that the distance between the push link and the fulcrum of the main lever relative to the distance from the fulcrum to the load bearing on the main lever is the same as the distance from the push link to the fulcrum of the sublever is to the distance from the fulcrum to the load bearing of the sublever, said sublever being located substantially on a center line of the main lever, and the fulcrum bearing, load bearing and push link bearing on the sublever being disposed in alignment substantially on the center of the sublever.

3. A scale lever system comprising, a main lever having laterally spaced double knife-edge bearings at one end constituting a fulcrum, a steelyard connection at the opposite end of the main lever, laterally spaced double knife-edge bearings on the main lever disposed in its intermediate portion, a sublever, a fulcrum bearing for one end of the sublever positioned adjacent the double knife-edge bearings in the intermediate portion of the main lever, a load bearing at the opposite end of the sublever, the distance between the fulcrum bearing and intermediate knife-edge bearings on the main lever and between the fulcrum bearing and load bearing on the sublever being the same, a load receiver having one end carried by laterally spaced knife-edge bearings in the intermediate portion of the main bearing, a load carrying link supporting the other end of the load receiver on the load bearing of the sublever, and a push link having a pivotal connection with the main lever on a center line between the fulcrum bearings and the intermediate bearings and having a pivotal connection with the sublever on a center line between the fulcrum bearing and load bearing of the sublever.

4. A scale lever system comprising, a main lever having laterally spaced double knife-edge bearings at one end constituting a fulcrum, a single knife-edge bearing at the opposite end of the main lever located on a center line between the spaced knife-edge bearings for connection to a steelyard, laterally spaced double knife-edge bearings on the main lever disposed in its intermediate portion, a sublever, a fulcrum bearing for one end of the sublever positioned adjacent the double knife-edge bearings in the intermediate portion of the main lever, a load bearing at the opposite end of the sublever, a load receiver having one end carried by laterally spaced knife-edge bearings in the intermediate portion of the main bearing, a load carrying link supporting the other end of the load receiver on the load bearing of the sublever, and a push link having a pivotal connection with the main lever on a center line between the fulcrum bearings and the intermediate bearings and having a pivotal connection with the sublever on a center line between the fulcrum bearing and load bearing of the sublever.

5. A scale lever system comprising, a main lever having laterally spaced double knife-edge bearings at one end constituting a fulcrum, a steelyard connection at the opposite end of the main lever, laterally spaced double knife-edge bearings on the main lever disposed in its intermediate portion, a sublever, a fulcrum bearing for one end of the sublever positioned adjacent the double knife-edge bearings in the intermediate portion of the main lever, a load bearing at the opposite end of the sublever, a load receiver having one end carried by laterally spaced knife-edge bearings in the intermediate portion of the main bearing, a load carrying link supporting the other end of the load receiver on the load bearing of the sublever, an upwardly disposed knife-edge bearing on the main lever disposed on its longitudinal center line, a downwardly disposed knife-edge bearing on the sublever, the load bearing and last mentioned knife-edge bearing on the sublever being disposed on the longitudinal center line of the sublever, and a push link having oppositely disposed V-bearings cooperating with the last mentioned knife-edge bearings on the main lever and sublever so that the distance between the push link and the fulcrum of the main lever relative to the distance from the fulcrum to the load bearing on the main lever is the same as the distance from the push link to the fulcrum of the sublever is to the distance from the fulcrum to the load bearing of the sublever.

6. A scale lever system comprising, a main lever, laterally spaced double knife-edge bearings at one end of the lever, bearings therefor providing a fulcrum, links cooperating therewith serving as hold-down elements, a single knife-edge bearing on the longitudinal center line of the lever and at the opposite end thereof for a steelyard connection, laterally spaced intermediate double knife-edge bearings on the main lever, a carrier with V-bearings mounted upon the intermediate knife-edge bearings and having links cooperating with the intermediate double knife-edge bearings and serving as hold-down elements, a single knife-edge bearing on the main lever disposed on its longitudinal center line half way between the fulcrum bearings and load receiver bearings, a sublever, knife-edge bearings at one end thereof constituting a fulcrum, a knife-edge bearing at the other end constituting a load bearing, a single knife-edge bearing half way between the fulcrum bearing and load bearing on the sublever with the load bearing and said single knife-edge bearing disposed on the longitudinal center line of the sublever, a knife-edge bearing at one end of the load receiver, a link connecting the last mentioned knife-edge bearing and the load bearing of the sublever, said sublever being located on the longitudinal center line of the main lever, and a push link having oppositely disposed V-bearings cooperating with the said single knife-edge bearings and the main lever and sublever, the distance between the fulcrum and load bearings of the sublever being the same as the distance between the fulcrum and intermediate double knife-edge bearings of the main lever 7. A scale lever system comprising, a main lever, a bearing at one end of the main lever and forming a fulcrum, a steelyard connection at the opposite end of the main lever, a load receiver, a bearing of the fixed type between one end of the load receiver and an intermediate portion of the main lever, a sublever, a fulcrum bearing at one end of the sublever, a load bearing at the other end of the sublever, a link connection between the load receiver and the load bearing of the sublever, and a push link between the sublever and main lever and operating on bearings on the main lever and sublever located so that the distance between the push link and the fulcrum of the main lever relative to the distance from the fulcrum to the load bearing on the main lever is the same as the distance from the push link to the fulcrum of the sublever is to the distance from the fulcrum to the load bearing of the sublever.

BERT W. KING.